Patented Mar. 6, 1945

2,370,768

UNITED STATES PATENT OFFICE 2,370,768

FOOD PRESERVATION METHOD

Francis K. Baerwald, Berkeley, Calif., assignor to Rosenberg Bros. & Co., San Francisco, Calif., a corporation of California No Drawing. Application October 2, 1944, Serial No. 556,899

8 Claims. (Cl. 99—171)

This invention relates generally to methods for the preservation of various food materials, and products resulting from such methods. More particularly the invention relates to methods serving to sterilize food materials in such a manner as to prevent spoilage by growth of microorganisms like mold, bacteria, or yeasts.

With conventional preserving methods as practiced on perishable food products, it is necessary to pack sterilized food material in airtight containers such as tin cans or glass jars in order to preserve the material without refrigeration for extended periods. Sterilization is generally accomplished by heat treatment, as by heating the filled and sealed cans to a temperature of 190° to 240° F. Certain chemical preservatives have also been used, with the chemical permanently incorporated in the product. Aside from the fact that airtight containers like cans or glass jars add considerably to the consumer price and are therefore not justified for many foods, many food products have properties such that they cannot be heat treated for sterilization, while "Pure Food and Drug" laws permit use of only a few chemical preservatives. Many methods for temporary preservation have been used, and although useful to somewhat postpone spoilage at room temperatures, they do not prevent re-contamination by microorganisms.

It is an object of the invention to provide a method for preserving food products in sterilized condition and marketable form, without relying upon the use of heat as a sterilizing agent and without the incorporation of chemical preservatives.

Another object of the invention is to provide a novel method making use of certain chemical sterilizing agents which are highly volatile at atmospheric pressure and room temperature, particularly agents which can be termed bactericidal and fungicidal fumigants which serve to kill microorganisms such as bacteria, yeasts and molds present on or in the commodity.

A further object of the invention is to provide a method of the above character which although it makes use of a chemical agent to kill microorganisms such as bacteria, yeasts and molds, does not leave any residue on the commodity or form reaction products with the ingredients of the product.

Another object of the invention is to provide a novel method enabling the introduction of small measured amounts of the highly volatile agent into containers.

Another object of the invention is to provide a new article of manufacture in the form of a container made from a moisture-proof film, like moisture-proof Cellophane or Pliofilm, and enclosing a sterilized food material.

Additional objects of the invention will appear from the following description in which the preferred embodiments have been set forth in detail.

The present invention is characterized by the use of relatively inexpensive containers, and by the fact that the food material is sterilized by the action of a highly volatile bactericidal and fungicidal fumigant, after the food material has been introduced into the containers and after the containers have been sealed. The bactericidal and fungicidal fumigant is such that in its gaseous phase it sterilizes the food material or commodity by killing microorganisms such as bacteria, yeasts and molds present on or in the product. This action takes place without leaving any residue on the product, and without forming any reaction products with ingredients of the product. The containers employed for my method are not completely gas-tight as compared to tin cans or glass jars, and particularly they are pervious to the volatile agent employed. In this way I confine the sterilizing treatment to a temporary period of time, which time is insufficient to allow the formation of objectionable reaction products.

One type of inexpensive container which I have used with good results is a bag formed entirely of a moisture-proof film, like moisture-proof Cellophane or Pliofilm. The longitudinal and bottom seams of the bag can be formed by heat sealing, as for example by use of a bag making machine such as shown in patents, 2,094,594 and 2,347,902. The mouth of the bag is also closed by heat sealing, after the bag has been filled with the product. Such bags when properly sealed are "non-breathing" with respect to the exterior atmosphere, and I have found that there is no appreciable tendency for bacteria, yeasts and molds from the exterior atmosphere to enter such a bag over substantial periods of time, such as several months. The term "moisture-proof" as used herein has reference to materials relatively impervious to penetration by water vapor (see Charch et al. Patent 1,737,187).

While I prefer to employ containers of the bag type as described above, I can employ more permanent containers such as glass jars or cans, provided the container is supplied with a wall or window formed of material permeable to the sterilizing medium but which will not permit entrance of microorganisms. For example I can employ a glass jar having a sealing lid provided with a window formed of moisture-proof Cellophane or Pliofilm.

As bactericidal and fungicidal fumigants, I have employed ethyleneoxide, propyleneoxide (a homolog of ethyleneoxide), and methylbromide, which are highly volatile at atmospheric pressure and room temperature. Because of their highly volatile character the use of such agents involves certain problems, particularly in that it is difficult to introduce small measured amounts of the same into the container before sealing. Therefore I prefer to utilize such agents in conjunction with a medium capable of lowering the vapor pressure of the same. Any such medium should be non-toxic and should not form any objectionable reaction residues with the product. Various liquid mediums which can be used for this purpose include water, suitable alcohols such as ethyl alcohol, ethylene dichloride or propylene glycol. Such mediums are mixed in suitable portions with the sterilizing agent to form a relatively stable solution or mixture for introduction in measured amounts into the moisture-proof containers, immediately before the container is sealed. After sealing the container at room temperature, the highly volatile sterilizing agent evaporates from the solution or mixture to provide a gaseous sterilizing atmosphere within the container. The gaseous sterilizing agent gradually penetrates through the walls of the container, so that for example with a moisture-proof Cellophane bag, after a period of about twenty-four hours only traces remain in the container, and all traces disappear in about three days.

One procedure which I have followed for the purpose of introducing measured amount of the solution or mixture, is to employ a small piece of absorbent material, such as cardboard or blotting paper, which is dipped into the solution, and then introduced into the container, after which the container is sealed. After the volatile sterilizing agent has evaporated from the solution, the liquid medium such as water or propylene glycol remains. Over an extended period of time a medium like water is absorbed by the product. Where ethylene dichloride is used to lower the vapor pressure of the sterilizing agent, it will evaporate and eventually dissipate through the walls of the Cellophane or Pliofilm. When stable mediums like propylene glycol are employed direct contact with the product can be avoided by the use of a small unsealed packet of Cellophane or Pliofilm to enclose the blotting paper.

Water and ethylene oxide form a desirable and convenient solution for introduction into the containers. Measured amounts of such a solution can be readily introduced into the containers by use of a piece of cardboard or blotting paper of predetermined size, which is dipped into this solution and then introduced into the container. Another procedure which has given good results is to freeze the solution of water and ethyleneoxide, and store the frozen material at a sufficiently low temperature to avoid evaporation of the ethyleneoxide. For example, if the ice is stored at temperatures of the order of −30 to −70° C., evaporation of ethyleneoxide is prevented. This ice can be crushed or ground to form a snow, and then a measured amount of snow is introduced into the container immediately before sealing. As the temperature of the frozen solution rises, evaporation of the ethyleneoxide occurs to form a sterilizing atmosphere in the same manner as described above.

While grinding of the ice into a snow is desirable, one can directly introduce cubes or pellets of the ice into the container. Also, the frozen solution can be introduced into a small packet, which is then placed in the container in which the sterilizing atmosphere is to be formed.

Methylbromide is only slightly soluble with water, and therefore it is not possible to intermix these ingredients to form a solution. However I have found it possible to form a frozen mixture of methylbromide and water, as by pouring a proper amount of water into liquid methylbromide, which is being refrigerated by solid carbon dioxide. This mixture can likewise be stored at low temperatures, such as −30 to −70° C., and when permitted to melt, methylbromide is released. It can be used either as snow or in pellets.

The proportions employed in preparing a mixture or solution of the sterilizing agent with the medium for lowering the vapor pressure of the agent, may vary in different instances. By way of example, one part (by weight) of ethyleneoxide can be used with from 1 to 4 parts or more of water, and proportions of the same character can be used with frozen mixtures of methylbromide and water, or solutions of ethyleneoxide and ethyl alcohol or propylene glycol. A solution of ethyleneoxide and ethylene dichloride can consist for example of 30% of the former with 70% of the ethylene dichloride. Propyleneoxide can be used in the same general manner as ethyleneoxide, although the amount employed for treatment of a given amount of food should be about twice the amount of ethyleneoxide required. Whatever proportions are employed, the quantity of the solution or mixture should be such as to provide the desired temporary sterilizing period after sealing the bag.

With respect to the various food materials to which the method can be applied to advantage, I have used it for example to preserve dried fruits, such as prunes and dates. Also, I have applied it to fresh meats, various types of sausages, vegetables, and fresh fruits and berries. Enzymic activity is not inhibited by my method, and therefore spoilage caused by enzymes which are constituents of the product is not prevented. Also oxidative deterioration is not prevented by this method.

In applying the method to dried fruits such as prunes, customary use of hot packaging can be omitted. For example prunes can be processed by immersing them in hot water to bring the moisture content to about 29%, then permitting them to stand in contact with the atmosphere to cool off to a substantially lower temperature, such as 130°, after which they are introduced into moisture-proof Cellophane bags, the sterilizing agent is introduced and the bags heat sealed. Fruit packed in this manner is preserved indefinitely against growth of bacteria, yeasts and molds, even though subjected to severe tropical climates. While enzymic activity is not inhibited when treating fresh meat, sausages, vegetables, fruits and berries, sterilization against bacteria, yeasts and molds greatly extends the practical keeping periods for such products, both at room and refrigeration temperatures.

My method is also applicable in the preservation of frozen products. For example frozen products such as vegetables, fruits or berries can be introduced into moisture-proof Cellophane or Pliofilm bags and a frozen mixture or solution containing the sterilizing agent introduced, in the manner previously described. When heat sealed and refrigerated to low temperatures of the order of −20° F., the sterilizing agent will remain in solution within the bag for an indefinite period of time. At the end of the refrigeration period, as for example when the packaged product is sold to a consumer, the increase of temperature occurring when the product is permitted to thaw out results in evaporation of the sterilizing agent, with the result that at that time bacteria, yeasts and molds are killed. The product is now preserved in the same manner as previously described, and it can therefore be kept at room temperatures for a considerable period of time before being taken out of the package and used. The subject matter of this paragraph is being disclosed and claimed in my co-pending application Serial No. 571,115, filed Jan. 2, 1945, entitled Frozen food method and product.

Tests have been made which demonstrate the effectiveness of the method in preventing growth of bacteria, yeasts and molds. For example in one series of tests, dried prunes were processed by immersing them in boiling water, thus bringing the moisture content up to about 29%. The prunes were then drained and permitted to stand in contact with the atmosphere for an extended period of time, during which they cooled to room temperature. They were then introduced into a number of moisture-proof Cellophane bags, having heat sealed seams. Two pounds of prunes were placed in each bag, and each bag had a capacity of about 75 cubic inches (after sealing).

To provide a basis of comparison, the solutions were prepared as follows:

|   | Ethylene oxide | Water |
|---|---|---|
| A | 0 | 1 |
| B | 1 | 1 |
| C | 1 | 2 |
| D | 1 | 3 |
| E | 1 | 4 |
| F | 1 | 5 |
| G | 1 | 6 |

The above parts were by weight. The solutions were kept at a temperature of about 15° C. to prevent loss of ethylene oxide. Small pieces of cardboard measuring about 4½ inches long and 2⅛ inches wide were dipped into and saturated with the various solutions, and inserted into the bags. Immediately thereafter the bags were heat sealed. It was established that the pieces of cardboard each retained about 2 grams of solution.

For the purpose of determining the relative degree of preservation obtained by the various samples, all of the bags were stored at a temperature between about 85 to 90° F. At various times bags from each lot were opened and compared. It was observed that in ten days the contents of all of the bags of lot A were moldy. All of lots B to G inclusive were in good condition. Twenty-one days after sealing the bags, all of the bags of lots F and G were moldy, and some of lot E were moldy. All of the bags of lots B, C and D were in good condition, as were also most of the bags of lot E. Two months after sealing of the bags, more of the bags of lot E became moldy, but all of the bags from lots B, C and D remained in good condition. No further change occurred three months after sealing.

From the above, it was established that where preservation is not required for long periods of time, relative dilute solutions, or conversely, relatively small amounts of ethylene oxide will suffice. However, for longer periods of preservation such as two or three months or longer, more complete sterilization is required, such as is obtained by using more solution or higher concentrations of ethylene oxide in the solution.

An additional series of tests for the purpose of sterilizing sausages can be described as follows: Two batches of solution were prepared, one containing one part ethylene oxide to three parts of water by weight, and a second containing one part ethylene oxide to four parts of water. These two solutions were then frozen in suitable containers refrigerated by solid carbon dioxide. The two masses of ice were then ground to form a snow. Pending its use, the snow was stored at a relatively low temperature, of the order of −50° C. to prevent evaporation of the ethylene oxide.

The containers employed were moisture-proof Cellophane bags, formed of a sheet of moisture-proof Cellophane heat sealed as previously described. Each bag measured 9 inches long by 4½ inches wide when flat, and had a capacity of about 75 cubic inches when sealed.

Pieces of frankfurter sausage were placed in each of 32 bags. Two bags were heat sealed without introduction of solution. Of the remaining 30 bags, the snow was introduced in quantities as follows:

|   | No. of bags | Amount of snow |
|---|---|---|
|   |   | *Grams* |
| Solution, 1:3 concentration | 3 | 0.4 |
|   | 3 | 0.8 |
|   | 3 | 1.0 |
|   | 3 | 1.2 |
|   | 3 | 1.5 |

|   | No. of bags | Amount of snow |
|---|---|---|
|   |   | *Grams* |
| Solution, 1:4 concentration | 3 | 0.4 |
|   | 3 | 0.8 |
|   | 3 | 1.0 |
|   | 3 | 1.2 |
|   | 3 | 1.5 |

Each bag was heat sealed immediately after introducing the snow, and after sealing the bags were stored at from 85 to 90° F. After one day, spoilage was apparent in the samples which received no snow. Some spoilage was also apparent in the bags which received only about .4 gram, of both concentrations 1:3 and 1:4. All of the other bags were in good condition. A bacterial count was made with the result that the sausage packed with 0.4 gram of snow, a bacterial count of 500,000,000 per sausage was obtained. The bacterial count was negative for the sausages packed with 0.8 to 1.5 grams snow of either concentration.

I have secured complete sterilization of sausage in moisture-proof Cellophane bags of the same size as specified in the foregoing samples, by introducing 1, 2 and 3 grams of snow, where the snow was a mixture containing 50% water and 50% methyl bromide. Use of methyl bromide is advantageous in that it is non-inflammable. At present this agent is widely used as an insecticidal fumigant in the food industry, but its ability to serve as a sterilizing agent has not been recognized.

The results of additional tests for preservation of sausage by use of a solution of ethylene oxide and water absorbed by a cardboard carrier can be cited as follows: A solution was prepared containing one part ethylene oxide to one part by weight of water. The containers used were moisture-proof Cellophane bags having heat sealed seams, and when flat measuring 9 inches by 4½ inches. These bags when sealed had a capacity of about 75 cubic inches. Pieces of cardboard employed measured about 4½ by 2⅛ inches. Frankfurter sausages were introduced into the containers, 10 of the bags were heat sealed without introducing the solution, and the remaining 10 received a cardboard carrier which had been dipped in the solution. It was determined that the sausage had an initial bacterial count of approximately 60,000,000 organisms per sausage.

All of the 20 bags were stored at a temperature of about 85 to 90° F. After twenty-four hours the contents of all of the 10 bags which received no solution were slimy and spoiling. The contents of all of the remaining 10 bags were in good condition.

After three days, a bacterial count was made with respect to certain of the samples. The check samples contained about 500,000,000 organisms per sausage, whereas the samples which had received the solution yielded no organisms. After both 10 and 15 days, samples from the bags which received the solution showed no bacterial count.

It will be appreciated that the amount of the sterilizing agent required for complete sterilization is dependent upon certain factors. Thus in general, products such as fresh meats require more of the sterilizing agent than products such as dried fruits. Less permeable containers, such as Pliofilm, do not require the quantities which should be used with moisture-proof Cellophane containers. For a given material such as prunes, an increase in moisture content generally requires an increased amount of sterilizing agent. It is advisable to provide an amount of the agent somewhat in excess of that theoretically sufficient, in order to insure consistent results.

In the foregoing reference has been made to different types of containers which can be used with my method. It will be evident that aside from the use of bags made from moisture-proof Cellophane or Pliofilm, other types of containers may be employed consisting for example of relatively rigid fiber walls impregnated with suitable material and having a seal such that it is non-breathing with respect to the atmosphere. In general whatever type of container is employed, it should after being closed and sealed allow the enclosed bactericidal and fungicidal fumigant to form a gaseous sterilizing atmosphere in the enclosed space. It must allow the sterilizing atmosphere to be maintained over a period sufficient to kill microorganisms present within the container, that is on the inside walls of the container, on or in the enclosed commodities and in the voids of spaces inside of the container not occupied by the product being treated. One or more walls of the container must be pervious to the gaseous bactericidal and fungicidal fumigant to allow dissipation of the sterilizing atmosphere after a sterilizing period without in any way breaking the seal or seams of the container or otherwise opening the container to the atmosphere. While the container must permit restricted movement of gases within the enclosed interior, it must not allow passage of microorganisms through its walls, seams or seals, after being closed.

The above recited examples demonstrate the effectiveness of the present method. They also demonstrate practicability of marketing various food materials normally subjected to mold growth or growth of contaminating bacteria or yeasts, without expensive containers and without refrigeration. Careful analysis of products preserved by my method over extended periods of time have not revealed the presence of any objectionable residues on or in the product, and the flavor, palatability and nutritive value of the product is not impaired.

This application is a continuation-in-part of my copending application Serial No. 421,012, filed November 29, 1941, entitled "Food preservation method and product."

I claim:

1. In a method for the preservation of food products against spoilage by growth of microorganisms like mold, bacteria or yeasts, the steps of introducing the food product into a non-breathing moisture-proof container, introducing into the container a measured amount of a highly volatile agent together with a medium capable of lowering the vapor pressure of the agent, the agent together with the medium being in non-gaseous form, the agent in its gaseous phase being a bactericidal and fungicidal fumigant, the container having a wall of the same pervious to said agent, and then sealing the container whereby the agent provides a sterilizing gaseous atmosphere in the container to kill microorganisms like mold, bacteria and yeasts, and which gaseous agent completely dissipates through the aforesaid wall of the container after a temporary sterilizing period, leaving the product thereafter sterilized.

2. In a method for the preservation of foods against spoilage by growth of microorganisms like mold, bacteria, or yeasts, the steps of introducing the food material into a non-breathing moisture-proof container having walls pervious to highly volatile sterilizing agents, introducing into the container a material comprising water and the sterilizing agent, and then sealing the container, whereby evolution of the agent from the last-mentioned material provides a sterilizing atmosphere in the container, which sterilizing atmosphere substantially completely dissipates through the walls of the container after a temporary sterilizing period.

3. In a method for the preservation of food products against spoilage by growth of microorganisms like mold, bacteria or yeasts, the steps of introducing the food product into a non-breathing moisture-proof container, introducing into the container a piece of moisture absorbent material containing an absorbed solution consisting of a highly volatile agent and a liquid capable of lowering the vapor pressure of the agent, the agent in its gaseous phase being a bactericidal and fungicidal fumigant, the container having a wall of the same pervious to said agent, and then sealing the container whereby the agent provides a sterilizing gaseous atmosphere in the container to kill microorganisms like mold, bacteria or yeasts and which gaseous agent completely dissipates through the walls of the container after a temporary sterilizing period, leaving the product thereafter sterilized.

4. In a method for the preservation of foods against spoilage, by growth of microorganisms like mold, bacteria or yeasts, the steps of introducing the food material into a non-breathing moisture-proof container having walls pervious to highly volatile sterilizing agents, introducing into the container a frozen material comprising water and the sterilizing agent, and then sealing the container, whereby evolution of the agent from the frozen material provides a sterilizing atmosphere in the container, which atmosphere completely dissipates through the walls of the container after a temporary sterilizing period.

5. In a method for the preservation of food products against spoilage by growth of microorganisms like mold, bacteria or yeasts, the steps of introducing the food product into a non-breathing moisture-proof container, introducing a measured amount of a solution into the container, the solution consisting of ethyleneoxide together with a liquid medium capable of lowering the vapor pressure of the ethyleneoxide, one wall of the container being pervious to gaseous phase ethyleneoxide, and then sealing the container whereby the ethyleneoxide provides a sterilizing gaseous atmosphere in the container to kill microorganisms like mold, bacteria or yeasts, and which gaseous atmosphere completely dissipates through said wall of the container after a temporary sterilizing period, leaving the product thereafter sterilized.

6. In a method for the preservation of foods against spoilage by growth of microorganisms like mold, bacteria or yeasts, the steps of introducing the food material into a container formed of a moisture-proof film pervious to ethyleneoxide, introducing into the container a piece of moisture absorbent material containing an absorbed solution consisting of water and ethyleneoxide, and then immediately sealing the container whereby evolution of ethyleneoxide from the solution provides a sterilizing atmosphere in the container, which atmosphere completely dissipates from the container after a temporary sterilizing period.

7. In a method for the preservation of foods against spoilage by growth of microorganisms like mold, bacteria or yeasts, the steps of introducing the food material into a bag formed from a thin moisture-proof film pervious to ethyleneoxide, introducing into the bag an amount of frozen material including water and ethyleneoxide, and then sealing the bag before melting of the frozen material, whereby after sealing of the bag evolution of ethyleneoxide provides a sterilizing atmosphere in the container, which atmosphere substantially completely dissipates from the container after a temporary sterilizing period.

8. In a method for the preservation of foods against spoilage by growth of microorganisms like mold, bacterial, or yeasts, the steps of introducing the food material into a bag formed from a thin moisture-proof film pervious to methylbromide, introducing into the bag an amount of frozen material including water and methylbromide, and then sealing the bag before melting of the frozen material, whereby after sealing of the bag evolution of methylbromide provides a sterilizing atmosphere in the container, which atmosphere substantially completely dissipates from the container after a temporary sterilizing period.

FRANCIS K. BAERWALD.